(12) United States Patent
Meijers et al.

(10) Patent No.: US 6,383,968 B1
(45) Date of Patent: May 7, 2002

(54) PROCESS FOR THE POLYMERIZATION OF OLEFINS

(75) Inventors: Ramon H. A. M. Meijers, Brunssum; Maurits F. H. Van Tol, Sittard; Mirko Kranenburg, Maastricht, all of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/468,223

(22) Filed: Dec. 20, 1999

(30) Foreign Application Priority Data

Dec. 21, 1998 (EP) .............................................. 98204349

(51) Int. Cl.$^7$ ........................... B01J 31/14; B01J 31/38; C08F 4/44
(52) U.S. Cl. ..................... 502/104; 502/113; 502/117; 502/118; 502/152; 502/155; 526/160; 526/161; 526/943
(58) Field of Search ................................. 526/160, 161, 526/943; 502/104, 113, 117, 118, 152, 155

(56) References Cited

U.S. PATENT DOCUMENTS 6,207,775 B1 * 3/2001 Marti et al. ................. 526/160

* cited by examiner

Primary Examiner—David W. Wu
Assistant Examiner—R. Harlan
(74) Attorney, Agent, or Firm—Pillsbury Winthrop LLP

(57) ABSTRACT

Process for the polymerization of olefins with a catalyst comprising a metallocene compound according to the formula

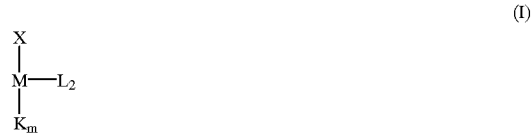

(I)

and an aluminoxane comprising 0,5 to 15 mol % trialkylaluminium.

Preferably the aluminoxane is methylaluminoxane and the trialkylaluminium is trimethylaluminium.

The metallocene compound and/or the aluminoxane can be supported on a carrier material.

20 Claims, No Drawings

PROCESS FOR THE POLYMERIZATION OF OLEFINS

The invention relates to a process for the polymerisation of olefins with a catalyst comprising a metallocene compound according to the formula

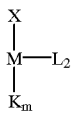

(I)

wherein the symbols have the following meanings:
M a reduced transition metal selected from group 4, 5 or 6 of the Periodic Table of Elements;
X a multidentate monoanionic ligand represented by the formula: $(Ar—R_t—)_s Y(—R_t—DR'_n)_q$;
Y a cyclopentadienyl, amido (—NR'—), or phosphido group (—PR'—), which is bonded to the reduced transition metal M;
R at least one member selected from the group consisting of (i) a connecting group between the Y group and the $DR'_n$ group and (ii) a connecting group between the Y group and the Ar group, wherein when the ligand X contains more than one R group, the R groups can be identical to or different from each other;
D an electron-donating hetero atom selected from group 15 or 16 of the Periodic Table of Elements;
R' a substituent selected from the group consisting of a hydrogen, hydrocarbon radical and hetero atom-containing moiety, except that R' cannot be hydrogen when R' is directly bonded to the electron-donating hetero atom D, wherein when the multidentate monoanionic ligand X contains more than one substituent R', the substituents R' can be identical or different from each other;
Ar an electron-donating aryl group;
L a monoanionic ligand bonded to the reduced transition metal M;
K a neutral or anionic ligand bonded to the reduced transition metal M, wherein when the metallocene compound contains more than one ligand K, the ligands K can be identical or different from each other;
m is the number of K ligands, wherein when the K ligand is an anionic ligand m is 0 for $M^{3+}$, m is 1 for $M^{4+}$, and m is 2 for $M^{5+}$, and when K is a neutral ligand m increases by one for each neutral K ligand;
n the number of the R' groups bonded to the electron-donating hetero atom D, wherein when D is selected from group 15 of the Periodic Table of Elements n is 2, and when D is selected from group 16 of the Periodic Table of Elements n is 1;
q,s q and s are the number of $(—R_t—DR'_n)$ groups and $(Ar—R_t)$ groups bonded to group Y, respectively, wherein q+s is an integer not less than 1; and
t the number of R groups connecting each of (i) the Y and Ar groups and (ii) the Y and $DR'_n$ groups, wherein t is selected independently as 0 or 1, and an aluminoxane.
Such a process is known from WO-96/13529.

In this patent application it is described that polyolefins can be polymerised with a catalyst containing a metallocene compound and an aluminoxane.

We have now discovered that when during polymerisation a catalyst is used comprising an aluminoxane comprising 0.5 to 15 mol % trialkylaluminium the catalyst activity is substantially higher when compared with a catalyst system comprising a standard aluminoxane comprising about 30 mol % trialkylaluminium.

This aluminoxane must be combined with a metallocene compound with a monoanionic ligand L which is bonded to the reduced transition metal M with a sigma bond, at least one L being a group comprising an element from group 14, 15 or 16 of the Periodic Table of Elements. Aluminoxanes with a lower amount of trialkylaluminium are known.

They are described for instance in WO-97/43320.

In WO-97/43320 is not described or suggested that because of using an aluminoxane comprising 0.5 to 15 mol % trialkylaluminium during polymerisation catalysts with a good activity are obtained.

Aluminoxanes which are substantially free of trialkylaluminium are known from WO 97/23288.

A disadvantage of the use of an aluminoxane which is substantially free of trialkylaluminium is that the use of this cocatalyst does not give a high activity catalyst system when combined with a metallocene compound according to formula (I).

The aluminoxane used in the process according to the invention comprises preferably 1–12 mol % trialkylaluminium and more preferably 6 to 10 mol % trialkylaluminium.

In the aluminoxane used according to the invention is preferably methylaluminoxane and the trialkylaluminium is trimethylaluminium.

The aluminoxane according to the invention can for instance be prepared by treating a standard aluminoxane, containing about 30 mol % TMA, under a pressure of 0.1 to 1000 Pa during 2–5 hours at a temperature between 45–150° C. The temperature is preferably between 80 and 140° C. The pressure is preferably between 1 and 100 Pa. According to this method an aluminoxane is formed with 7–9 mol % alkylaluminium. This preparation method is preferably used, because the aluminoxane obtained according to this method has a good solubility in toluene. This is an advantage when the aluminoxane according to the invention is dosed to the polymerisation reactor in toluene and is also an advantage during catalyst preparation in toluene.

The metallocene compound according to formula I is described for instance in WO-A-96/13529.

Various components of the metallocene compound are discussed below in more detail.

(a) The Transition Metal (M)

The transition metal in the complex is selected from groups 4–6 of the Periodic Table of Elements. As referred to herein, all references to the Periodic Table of Elements mean the version set forth in the new IUPAC notation found on the inside of the cover of the Handbook of Chemistry and Physics, 70th edition, 1989/1990, the complete disclosure of which is incorporated herein by reference.

The transition metal is present in reduced form in the complex, which means that the transition metal is in a reduced oxidation state. As referred to herein, "reduced oxidation state" means an oxidation state which is greater than zero but lower than the highest possible oxidation state of the metal (for example, the reduced oxidation state is at most $M^{3+}$ for a transition metal of group 4, at most $M^{4+}$ for a transition metal of group 5 and at most $M^{5+}$ for a transition metal of group 6).

(b) The X Ligand

The X ligand is a multidentate monoanionic ligand represented by the formula: $(Ar—R_t—)_s Y(—R_t—DR'_n)_q$.

As referred to herein, a multidentate monoanionic ligand is bonded with a covalent bond to the reduced transition metal (M) at one site (the anionic site, Y) and is bonded either (i) with a coordinate bond to the transition metal at one other site (bidentate) or (ii) with a plurality of coordinate bonds at several other sites (tridentate, tetradentate, etc.). Such coordinate bonding can take place, for example, via the D heteroatom or Ar group(s). Examples of tridentate monoanionic ligands include, without limitation, Y—$R_t$—$DR'_{n-1}$—$R_t$—$DR'_n$ and Y(—R—$DR'_n)_2$. It is noted, however, that heteroatom(s) or aryl substituent(s) can be present on the Y group without coordinately bonding to the reduced transition metal M, so long as at least one coordinate bond is formed between an electron-donating group D or an electron donating Ar group and the reduced transition metal M.

R represents a connecting or bridging group between the $DR'_n$ and Y, and/or between the electron-donating aryl (Ar) group and Y. Since R is optional, "t" can be zero. The R group is discussed below in paragraph (d) in more detail.

(c) The Y Group

The Y group of the multidentate monoanionic ligand (X) is preferably a cyclopentadienyl, amido (—NR'—), or phosphido (—PR'—) group.

Most preferably, the Y group is a cyclopentadienyl ligand (Cp group). As referred to herein, the term cyclopentadienyl group encompasses substituted cyclopentadienyl groups such as indenyl, fluorenyl, and benzoindenyl groups, and other polycyclic aromatics containing at least one 5-member dienyl ring, so long as at least one of the substituents of the Cp group is an $R_t$—$DR'_n$ group or $R_t$—Ar group that replaces one of the hydrogens bonded to the five-member ring of the Cp group via an exocyclic substitution.

Examples of a multidentate monoanionic ligand with a Cp group as the Y group (or ligand) include the following (with the (—$R_t$—$DR'_n$) or (Ar—$R_t$—) substituent on the ring):

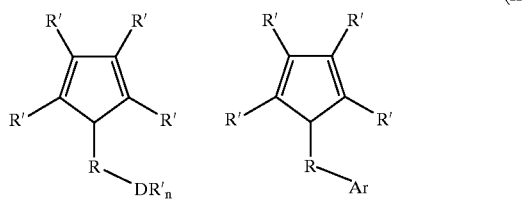

(II)

The Y group can also be a hetero cyclopentadienyl group. As referred to herein, a hetero cyclopentadienyl group means a hetero ligand derived from a cyclopentadienyl group, but in which at least one of the atoms defining the five-member ring structure of the cyclopentadienyl is replaced with a hetero atom via an endocyclic substitution. The hetero Cp group also includes at least one $R_t$—DR', group or $R_t$—Ar group that replaces one of the hydrogens bonded to the five-member ring of the Cp group via an exocyclic substitution. As with the Cp group, as referred to herein the hetero Cp group encompasses indenyl, fluorenyl, and benzoindenyl groups, and other polycyclic aromatics containing at least one 5-member dienyl ring, so long as at least one of the substituents of the hetero Cp group is an $R_t$—$DR'_n$ group or $R_t$—Ar group that replaces one of the hydrogens bonded to the five-member ring of the hetero Cp group via an exocyclic substitution.

The hetero atom can be selected from group 14, 15 or 16 of the Periodic Table of Elements. If there is more than one hetero atom present in the five-member ring, these hetero atoms can be either the same or different from each other. More preferably, the hetero atom(s) is/are selected from group 15, and still more preferably the hetero atom(s) selected is/are phosphorus.

By way of illustration and without limitation, representative hetero ligands of the X group that can be practiced in accordance with the present invention are hetero cyclopentadienyl groups having the following structures, in which the hetero cyclopentadienyl contains one phosphorus atom (i.e., the hetero atom) substituted in the five-member ring:

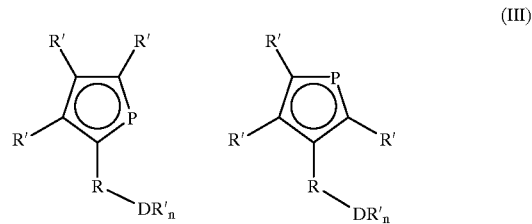

(III)

It is noted that, generally, the transition metal group M is bonded to the Cp group via an $\eta^5$ bond.

The other R' exocyclic substituents (shown in formula (III)) on the ring of the hetero Cp group can be of the same type as those present on the Cp group, as represented in formula (II). As in formula (II), at least one of the exocyclic substituents on the five-member ring of the hetero cyclopentadienyl group of formula (III) is the $R_t$—$DR'_n$ group or the $R_t$—Ar group.

The numeration of the substitution sites of the indenyl group is in general and in the present description based on the IUPAC Nomenclature of organic Chemistry 1979, rule A 21.1. The numeration of the substituent sites for indene is shown below. This numeration is analogous for an indenyl group:

The Y group can also be an amido (—NR'—) group or a phosphido (—PR'—) group. In these alternative embodiments, the Y group contains nitrogen (N) or phosphorus (P) and is bonded covalently to the transition metal M as well as to the (optional) R group of the (—$R_t$—$DR'_n$) or (Ar—$R_t$—) substituent. The Y group can also be a boratabenzene group. In this alternative embodiment, the Y group is a six membered aromatic ring containing 5 carbons and a boron atom. The boratabenzene ring may be substituted.

(d) The R Group

The R group is optional, such that it can be absent from the X group. Where the R group is absent, the $DR'_n$ or Ar group is bonded directly to the Y group (that is, the $DR'_n$ or Ar group is bonded directly to the Cp, amido, or phosphido group). The presence or absence of an R group between each of the $DR'_n$ groups and/or Ar groups is independent.

Where at least one of the R groups is present, each of the R group constitutes the connecting bond between, on the one hand the Y group, and on the other hand the $DR'_n$ group or the Ar group. The presence and size of the R group determines the accessibility of the transition metal M relative to the $DR'_n$ or Ar group, which gives the desired intramolecular coordination. If the R group (or bridge) is too short or absent, the donor may not coordinate well due to ring tension. The R groups are each selected independently, and can generally be, for example, a hydrocarbon group with 1–20 carbon atoms (e.g., alkylidene, arylidene, aryl alkylidene, etc.). Specific examples of such R groups include, without limitation, methylene, ethylene, propylene, butylene, phenylene, whether or not with a substituted side chain. Preferably, the R group has the following structure:

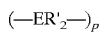 (IV)

wherein p is 1, 2, 3, or 4 and wherein E is an element from group 14 of the Periodic Table of the Elements and wherein each E may be the same or different. The R' groups of formula (IV) can each be selected independently, and can be the same as the R' groups defined below in paragraph (g).

In addition to carbon, the main chain of the R group can also contain silicon or germanium. Examples of such R groups are: dialkyl silylene (—SiR'$_2$—), dialkyl germylene (—GeR'$_2$—), tetra-alkyl silylene (—SiR'$_2$—SiR'$_2$—), or tetraalkyl silaethylene (—SiR'$_2$CR'$_2$—). The alkyl groups in such a group preferably have 1–4 carbon atoms and more preferably are a methyl or ethyl group.

(e) The DR'$_n$ Group

This donor group consists of an electron-donating hetero atom D, selected from group 15 or 16 of the Periodic Table of Elements, and one or more substituents R' bonded to D. The number (n) of R' groups is determined by the nature of the hetero atom D, insofar as n being 2 if D is selected from group 15 and n being 1 if D is selected from group 16. The R' substituents bonded to D can each be selected independently, and can be the same as the R' groups defined below in paragraph (g), with the exception that the R' substituent bonded to D cannot be hydrogen.

The hetero atom D is preferably selected from the group consisting of nitrogen (N), oxygen (O), phosphorus (P) and sulphur (S); more preferably, the hetero atom is nitrogen (N). Preferably, the R' group is an alkyl, more preferably an n-alkyl group having 1–20 carbon atoms, and most preferably an n-alkyl having 1–8 carbon atoms. It is further possible for two R' groups in the DR'$_n$ group to be connected with each other to form a ring-shaped structure (so that the DR'$_n$ group can be, for example, a pyrrolidinyl group). The DR'$_n$ group can form coordinate bonds with the transition metal M.

(f) The Ar Group

The electron-donating group (or donor) selected can also be an aryl group (C$_6$R'$_5$), such as phenyl, tolyl, xylyl, mesityl, cumenyl, tetramethyl phenyl, pentamethyl phenyl, a polycyclic group such as triphenylmethane, etc. The electron-donating group D of formula (I) cannot, however, be a substituted Cp group, such as an indenyl, benzoindenyl, or fluorenyl group.

The coordination of this Ar group in relation to the transition metal M can vary from $\eta^1$ to $\eta^6$.

(g) The R' Group

The R' groups may each separately be hydrogen or a hydrocarbon radical with 1–20 carbon atoms (e.g. alkyl, aryl, aryl alkyl and the like). Examples of alkyl groups are methyl, ethyl, propyl, butyl, hexyl and decyl. Examples of aryl groups are phenyl, mesityl, tolyl and cumenyl. Examples of aryl alkyl groups are benzyl, pentamethylbenzyl, xylyl, styryl and trityl. Examples of other R' groups are halides, such as chloride, bromide, fluoride and iodide, methoxy, ethoxy and phenoxy.

Also, two adjacent hydrocarbon radicals of the Y group can be connected with each other to define a ring system; therefore the Y group can be an indenyl, a fluorenyl or a benzoindenyl group. The indenyl, fluorenyl, and/or benzoindenyl can contain one or more R' groups as substituents. R' can also be a substituent which instead of or in addition to carbon and/or hydrogen can comprise one or more hetero atoms of groups 14–16 of the Periodic Table of Elements. Thus, a substituent can be, for example, a Si-containing group, such as Si(CH$_3$)$_3$.

(h) The L Group

The metallocene compound contains at least one monoanionic ligand L$^1$ bonded to the reduced transition metal M with a sigma bond, L$^1$ being a group comprising an element from group 14, 15 or 16 of the Periodic Table of Elements.

L$^1$ can, for instance, be a hydrocarbon group, an amide, an oxyde, a phosphide or a sulphide group. The L$^1$ groups can be the same or different. Examples of hydrocarbon groups are alkyl, aryl and aralkyl groups.

Preferably the hydrocarbon groups contain 1–20 carbon atoms. More specific examples of hydrocarbon groups are methyl, ethyl, propyl, n-butyl, isobutyl, heptyl, octyl, decyl, phenyl, benzyl, and p-tolyl groups.

The amide and phosphide groups have the formula —NR"$_2$ or —PR"$_2$. The oxyde or sulphide groups have the formula —OR" or —SR".

The R" groups may each, separately, be a hydrocarbon radical containing 1–20 carbon atoms (such as alkyl, aryl, aralkyl, and the like). Examples of such hydrocarbon radicals are methyl, ethyl, propyl, butyl, hexyl, decyl, phenyl, benzyl, and p-tolyl. Alternatively, two hydrocarbon radicals situated next to one another can be linked to one another in a ring system; R" may also be a group which in addition to, or instead of, carbon and/or hydrogen contains one or more hetero atoms from groups 14–17 of the Periodic System of the Elements, a hetero atom not being bound directly to the Cp. Thus R' may be an N—, O—, and F—, or Si— containing group.

The metallocene compound contains at least one monoanionic ligand L$^1$ bonded to the reduced transition metal center M via a sigma bond and additionally L$^1$ can be capable to non-covalently interact with M via one or more functional groups.

The functional group mentioned above can be one atom, but also a group of atoms connected together. The functional group is preferably an atom of group 17 of the Periodic Table of the Elements or a group containing one or more elements from groups 15, 16 or 17 of the Periodic Table of the Elements. Examples of functional groups are F, Cl, Br, dialkylamino and alkoxy groups.

L$^1$ can for instance be a phenyl group in which at least one of the ortho-positions is substituted with a functional group capable of donating electron density to the transition metal M. L$^1$ can also be a methyl group in which one or more of the alpha-positions is substituted with a functional group if capable of donating electron density to the transition metal M.

Examples of methyl groups substituted in one or more of the alpha-positions are benzyl, diphenylmethyl, ethyl, propyl and butyl substituted with a functional group capable of donating electron density to the transition metal M.

Preferably at least one of the ortho-positions of a benzyl-group is substituted with a functional group capable of donating electron density to the transition metal M.

Examples of L$^1$ groups containing one or more functional groups are: 2,6-difluorophenyl, 2,4,6-trifluorophenyl, pentafluorophenyl, 2-alkoxyphenyl, 2,6-dialkoxyphenyl, 2,4,6-tri(trifluoromethyl)phenyl, 2,6-di(trifluoromethyl) phenyl, 2-trifluoromethylphenyl, 2-(dialkylamino)benzyl and 2,6-(dialkylamino)phenyl.

The other ligand L, L$^2$, which is present when there is only one L$^1$ group, is an anionic ligand with the exclusion of a cyclopentadienyl group, an amido or phosphido group. Examples of L$^2$ are a hydrogen atom and a halogen atom. Preferably, L$^2$ is a halogenide; more preferably, a Cl group.

(i) The K Ligand

The K ligand is a neutral or anionic group bonded to the transition metal M. When K is a neutral ligand K may be absent, but when K is monoanionic, the following holds for K$_m$:

m=0 for $M^{3+}$ and M selected from groups 4, 5 or 6 of the Periodic Table of the Elements, m=1 for $M^{4+}$ and M selected from groups 5 or 6 of the Periodic Table of the Elements, m=2 for $M^{5+}$ and M selected from group 6 of the Periodic Table of the Elements, On the other hand, neutral K ligands, which by definition are not anionic, are not subject to the same rule. Therefore, for each neutral K ligand, the value of m (i.e., the number of total K ligands) is one higher than the value stated above for a complex having all monoanionic K ligands.

The K ligand can be a ligand as described above for the $L^2$ group or a Cp group ($—C_5R'_5$), an amido group ($—NR'_2$) or a phosphido group ($—PR'_2$). The K group can also be a neutral ligand such as an ether, an amine, a phosphine, a thioether, among others.

If two K groups are present, the two K groups can be connected with each other via an R group to form a bidentate ring system.

As can also be seen from formula (I), the X group of the complex contains a Y group to which are linked one or more donor groups (the Ar group(s) and/or $DR'_n$ group(s)) via, optionally, an R group. The number of donor groups linked to the Y group is at least one and at most the number of substitution sites present on a Y group.

With reference, by way of example, to the structure according to formula (II), at least one substitution site on a Cp group is made by an $R_t$—Ar group or by an $R_t$—$DR'_n$ group (in which case q+s=1). If all the R' groups in formula (II) were $R_t$—Ar groups, $R_t$—$DR'_n$ groups, or any combination thereof, the value of (q+s) would be 5.

The metallocene compound can also be obtained by contacting a metallocene compound according to formula I, wherein both ligands L are halogen, with a third compound comprising a metal out of group 13 of the Periodic System of the Elements, which third compound is not equal to the aluminoxane or the trialkylaluminium present in the aluminoxane.

The third compound is used as a so-called scavenger and can for instance be an aluminium containing compound. The scavenger is added to react with impurities in the reaction mixture. It is normally added to the reaction mixture before addition of the metal complex and the co-catalyst. Apart from being a scavenger the third compound can also react in-situ with a halogen-containing metallocene compound in such a way that one or more L groups are replaced with a group comprising an element from group 14 of the Periodic Table of Elements. The halogen-containing metallocene compound can be added to the reactor before or after the third compound. The third compound is present in an amount of 1 to 10.000 mol/mol metallocene compound. The third compound is normally added to the reactor before the addition of the aluminoxane compound.

The third compound is preferably an Al containing compound according to the formula $Al(C_bH_c)_3$, wherein b>1 and c=2b+1.

More preferably the third compound is trioctylaluminium, triisobutylaluminium, triethylaluminium, isoprenylaluminium or a mixture comprising one of these compounds.

One preferred embodiment of the catalyst composition according to the present invention comprises a metallocene compound in which a bidentate/monoanionic ligand is present and in which the reduced transition metal has been selected from group 4 of the Periodic Table of Elements and has an oxidation state of +3.

In this case, the catalyst composition according to the invention comprises a metallocene compound represented by formula (V):

where the symbols have the same meaning as described above for formula (I) and where M(III) is a transition metal selected from group 4, 5 or 6 of the Periodic Table of Elements and is in oxidation state 3+. Most preferably M(III) is Ti(III) or Cr(III).

Such a metallocene compound has no anionic K ligands (for an anionic K, m=0 in case of $M^{3+}$).

The molar ratio of the aluminoxane relative to the metallocene compound usually is in a range of from about 1:1 to about 10,000:1, and preferably is in a range of from about 1:1 to about 2,500:1. If a compound containing or yielding a non-coordinating or poorly coordinating anion is selected as As a person skilled in the art would be aware, the metallocene compound as well as the aluminoxane can be present in the catalyst composition as a single component or as a mixture of several components. For instance, a mixture may be desired where there is a need to influence the molecular properties of the polymer, such as molecular weight and in particular molecular weight distribution.

The catalyst composition according to the invention can be used by a method known as such as a catalyst component for the polymerisation of an olefin. The olefin envisaged in particular is an olefin chosen from the group comprising α-olefin, internal olefin, cyclic olefin and di-olefin. Mixtures of these can also be used.

The invention relates in particular to a process for the polymerisation of an α-olefin. The α-olefin is preferably chosen from the group comprising ethene, propene, butene, pentene, heptene, octene and styrene (substituted or non-substituted), mixtures of which may also be used. More preferably, ethene and/or propene is used as α-olefin. The use of such olefins results in the formation of (semi) crystalline polyethene homo- and copolymers, of high as well as of low density (HDPE, LDPE, LLDPE, etc.), and polypropene, homo- and copolymers (PP and EMPP). The monomers needed for such products and the processes to be used are known to the person skilled in the art.

The process according to the invention is also suitable for the preparation of amorphous or rubber-like copolymers based on ethene and another α-olefein. Propene is preferably used as the other α-olefin, so that EPM rubber is formed. It is also quite possible to use a diene besides ethene and the other α-olefin, so that a so-called EADM rubber is formed, in particular EPDM (ethene propene diene rubber).

The catalyst composition according to the invention can be used supported as well as non-supported. The supported catalysts are used mainly in gas phase and slurry processes.

The inert carrier material may be any finely divided solid porous support, including, but not limited to, $MgCl_2$, Zeolites, mineral clays, inorganic oxides such as talc, silica, alumina, silica-alumina, inorganic hydroxides, phosphates and sulphates, or resinous support materials such as polyolefins, including polystyrene, or mixtures thereof. These carriers may be used as such or modified, for example by silanes.

Preferably the carrier material is silica and/or $MgCl_2$.

The metallocene compound or the aluminoxane is supported on a carrier material. It is also possible that both the metallocene compound and the aluminoxane are supported on a carrier material. The carrier material for the metallocene compound and for the aluminoxane can be the same material or a different material. It is also possible to support the metallocene compound and the aluminoxane on the same carrier material. The supported catalyst systems of the invention can be prepared as separate compounds, which can be used as such in polymerisation reactions or the supported catalyst systems can be formed in situ just before a polymerisation reaction starts.

Polymerisation of the olefin can be effected in a known manner, in the gas phase as well as in a liquid reaction medium. In the latter case, both solution and suspension polymerisation are suitable, while the quantity of transition metal to be used generally is such that its concentration in the dispersion agent amounts to $10^{-8}$–$10^{-4}$ mol/l, preferably $10^{-7}$–$10^{-5}$ mol/l.

The process according to the invention will hereafter be elucidated with reference to a polyethene preparation known per se, which is representative of the olefin polymerisations meant here. For the preparation of other polymers on the basis of an olefin the reader is expressly referred to the multitude of publications on this subject.

The preparation of polyethene relates to a process for homopolymerisation or copolymerisation of ethene with one or more $\alpha$-olefins having 3–12 carbon atoms and optionally one or more non-conjugated dienes. The $\alpha$-olefins that are suitable in particular are propene, butene, hexene and octene. Suitable dienes are for instance 1,7-octadiene and 1,9-decadiene. It has been found that the catalyst composition of the present invention is especially suitable for solution or suspension polymerisation of ethene.

Any liquid that is inert relative to the catalyst system can be used as dispersion agent in the polymerisation. One or more saturated, straight or branched aliphatic hydrocarbons, such as butanes, pentanes, hexanes, heptanes, pentamethyl heptane or mineral oil fractions such as light or regular petrol, naphtha, kerosine or gas oil are suitable for that purpose. Aromatic hydrocarbons, for instance benzene and toluene, can be used, but because of their cost as well as on account of safety considerations, it will be preferred not to use such solvents for production on a technical scale. In polymerisation processes on a technical scale, it is preferred therefore to use as solvent the low-priced aliphatic hydrocarbons or mixtures thereof, as marketed by the petrochemical industry. If an aliphatic hydrocarbon is used as solvent, the solvent may yet contain minor quantities of aromatic hydrocarbon, for instance toluene. Toluene can be used as solvent in order to supply the MAO in dissolved form to the polymerisation reactor. Drying or purification is desirable if such solvents are used; this can be done without problems by the average person skilled in the art.

Such a solution polymerisation is preferably carried out at temperatures between 150° C. and 250° C.; in general, a suspension polymerisation takes place at lower temperatures, preferably below 100° C.

The polymer solution resulting from the polymerisation can be worked up by a method known per se. In general the catalyst is de-activated at some point during the processing of the polymer. The de-activation is also effected in a manner known per se, e.g. by means of water or an alcohol. Removal of the catalyst residues can mostly be omitted because the quantity of catalyst in the polymer, in particular the content of halogen and transition metal is very low now owing to the use of the catalyst system according to the invention.

Polymerisation can be effected at atmospheric pressure, but also at an elevated pressure of up to 500 MPa, continuously or discontinuously. If the polymerisation is carried out under pressure the yield of polymer can be increased additionally, resulting in an even lower catalyst residue content. Preferably, the polymerisation is performed at pressures between 0.1 and 25 MPa. Higher pressures, of 100 MPa and upwards, can be applied if the polymerisation is carried out in so-called high-pressure reactors. In such a high-pressure process the catalyst according to the present invention can also be used with good results.

The polymerisation can also be performed in several steps, in series as well as in parallel. If required, the catalyst composition, temperature, hydrogen concentration, pressure, residence time, etc. may be varied from step to step. In this way it is also possible to obtain products with a wide molecular weight distribution.

The invention will now be elucidated by means of the following non-restrictive examples.

EXAMPLES

MAO=methylaluminoxane
TMA=trimethylaluminium
THF=tetrahydrofuran
TOA=trioctylaluminium
Cp*=tetramethylcyclopentadiene
Cp=cyclopentadiene
Me=methyl
Et=ethylene
Res=2,6-dimethoxyphenyl
TMS=trimethylsilyl
$SiO_2$=silica

Example I

Preperation of Aluminium Alkyl Poor MAO (AAP MAO)

A schlenk vessel was filled with 50 ml of a MAO solution in toluene (Witco, 30 wt. % MAO in toluene) was added. The MAO solution was evaporated under vacuum (P=1 Pa) at 60° C. for 2 hour.

The resulting AAP-MAO was washed once with 50 ml petroleumether and 4 hours evaporated under vacuum (P=1 Pa) at 120° C.

This resulted in a white powder.

Analysis of the Aluminiumalkyl Value

A proton NMR spectrum of the AAP-MAO sample in $d_8$-tetrahydrofuran was determined. In $d_8$-tetrahydrofuran, all $CH_3$—Al resonances are sharpened and shifted upfield, due to complexation of Al centers with THF, with the TMA peak being shifted further upfield than the MAO resonance. From the TMA peak integral it was determined that the AAP-MAO sample contained 9 mol % TMA.

Example II and Comparative Experiment A

Polymerisation of Ethylene with ((dimethylaminoethyl)di(2,4-trimethylsilyl) cyclopentadienyl)titaniumdichloride and the AAP MAO of example I In a 1.5 l. steel autoclave, $4.10^{-4}$ mol TOA as scavenger was introduced with 600 ml. pentamethylheptane. Ethylene was then added to the reactor to bring the total pressure to 5. 10⁵ Pa. 0.5 μmol of dimethylaminoethyl)di(2,4-trimethylsilyl)cyclopentadienyl) titaniumdichloride catalyst (0.001 M solution in tolueen) was premixed for 1 minute with 2.5 mmol of a fresh prepared 1.5 M MAO/tolueen solution (AAP MAO prepared in example I). The temperature was brought to 80° C. The Al/Ti ratio was 6000. After premixing, the mixture was added to the reactor and the polymerisation starts under constant ethylene pressure at a temperature of 80° C.

After 10 minutes of polymerisation, the ethylene was vented off and the polymer was collected. The activity was compared with a test under the same polymerisation conditions but now using a commercial MAO with about 30 mol % TMA (Witco, 30 wt. % MAO in toluene)(Comparative Experiment A).

|  | Example II | Comparative Experiment A |
|---|---|---|
| activity (kgPE/gTi.5min) | 610 | 480 |

Examples III–V and Comparative Experiments B–D

Using the same polymerisation procedure as in example II but now using a catalyst system with different monoanionic ligands. The Al/Ti ratio was 2000.

| catalyst | Example | AAP MAO | Comp. Exp. | MAO |
|---|---|---|---|---|
| Cp* (EtNMe₂) TiMe₂ | III | 20 KgPE/ gTi.5min. | B | 7 KgPE/ gTi.5min. |
| Cp* (EtNMe₂) TiMeRes | IV | 60 KgPE/ gTi.5min. | C | 27 KgPE/ gTi.5min. |
| Cp* (EtNMe₂) Ti (Res)₂ | V | 80 KgPE/ gTi.5min. | D | 49 KgPE/ gTi.5min. |

Example VI

Preparation of ((dimethylaminoethyl)di(2,4-trimethylsilyl)cyclopentadienyl)titaniumdichloride on a Silica Supported with AAP MAO 0.5 g silica (MS3040 from the PQ Corporation dried under nitrogen for 10 hours at 150° C.) was added to 10 ml toluene. 0.58 g AAP-MAO was added to the slurry and stirred for 1 hour at room temperature. Gas production took place. The MAO/silica contains 24.7 wt % Al. After stirring for 1 hr, 2 ml of a $1.7.10^{-2}$ M (TMS)₂Cp(EtNMe₂)TiCl₂ toluene solution was added dropwise to the MAO/silica slurry and was stirred for another ½ hour. After a ½ hour stirring, the solvent was evaporated at room temperature under vacuum and a grey/green powder was obtained.

Examples VII–XIII and Comparative Experiments E–L

Polymerisation of Ethylene with a Supported Catalyst

Using the same procedure as in example II but now using the supported catalyst according to example VI with different ethylene pressures and different Al/Ti ratio's. These polymerisations are compared with polymerisations using commercial MAO with about 30 mol % TMA (Witco, 30 wt. % MAO in toluene)(Comparative Experiments E–K).

| Example/ Experiment | Support | Al/Ti | P $10^{-5}$ Pa | gPE/gkat.h |
|---|---|---|---|---|
| VII | AAP.MAO/SiO₂ | 75 | 5 | 346 |
| E | MAO/SiO₂ | 75 | 5 | 285 |
| VIII | AAP.MAO/SiO₂ | 75 | 20 | 2244 |
| F | MAO/SiO₂ | 75 | 20 | 1505 |
| IX | AAP.MAO/SiO₂ | 100 | 5 | 1014 |
| G | MAO/SiO₂ | 100 | 5 | 311 |
| X | AAP.MAO/SiO₂ | 100 | 20 | 3434 |
| H | MAC/SiO₂ | 100 | 20 | 1014 |
| XI | AAP.MAO/SiO₂ | 150 | 5 | 1505 |
| J | MAO/SiO₂ | 150 | 5 | 364 |
| XII | AAP.MAO/SiO₂ | 284 | 5 | 669 |
| K | MAO/SiO₂ | 284 | 5 | 347 |
| XIII | AAP.MAO/SiO₂ | 284 | 20 | 1277 |
| L | MAO/SiO₂ | 284 | 20 | 616 |

What is claimed is:

1. Catalyst composition comprising a metallocene according to the formula

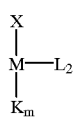

(I)

wherein:
M is a reduced transition metal selected from group 4, 5 or 6 of the Periodic Table of Elements;
X is a multidentate monoanionic ligand represented by the formula: $(Ar-R_t-)_s Y(-R_t-DR^1_n)_q$;
Y is a cyclopentadienyl, amido ($-NR^1-$), or phosphido group ($-PR^1-$), which is bonded to the reduced transition metal M;
R is at least one member selected from the group consisting of (i) a connecting group between the Y group and the $DR^1_n$ group and the (ii) a connecting group between the Y group and the Ar group, wherein when the ligand X contains more than one R group, the R groups can be identical to or different from each other;
D is an electron-donating hetero atom selected from group 15 or 16 of the Periodic Table of Elements;
$R^1$ is a substituent selected from the group consisting of a hydrogen, hydrocarbon radical and hetero atom-containing moiety, except that $R^1$ cannot be hydrogen when $R^1$ is directly bonded to the electron-donating hetero atom D, wherein when the multidentate monoanionic ligand X contains more than one substituent $R^1$, the substituents $R^1$ can be identical or different from each other;
Ar is an electron-donating aryl group;
L is a monoanionic ligand bonded to the reduced transition metal M;
K a neutral or anionic ligand bonded to the reduced transition metal M, wherein when the metallocene compound contains more than one ligand K, the ligands K can be identical or different from each other;
m is the number of K ligands, wherein when the K ligand is an anionic ligand m is 0 for $M^{3+}$, m is 1 for $M^{4+}$, and m is 2 for $M^{5+}$, and when K is a neutral ligand m increases by one for each neutral K ligand;

n is the number of the $R^1$ groups bonded to the electron-donating hetero atom D, wherein when D is selected from group 15 of the Periodic Table of Elements n is 2, and when D is selected from group 16 of the Periodic Table of Elements n is 1;

q, s are the number of ($-R_t-DR^1_n$) groups and ($Ar-R_t$) groups bonded to group Y, respectively, wherein q+s is an integer not less than 1; and t is the number of R groups connecting each of (i) the Y and Ar groups and (ii) the Y and $DR^1_n$ groups, wherein t is selected independently as 1 or 1;

and an aluminoxane, wherein the aluminoxane comprises 0.5 to 15 mol % trialkylaluminium and in that the monoanionic ligand L of the metallocene compound is bonded to the reduced transition metal M with a sigma bond, at least one L being a group comprising an element from group 14, 15 or 16 of the Periodic Table of Elements.

2. Catalyst composition as claimed in claim 1, wherein the metallocene compound and/or the aluminoxane are supported on a carrier material.

3. Catalyst composition according to claim 2, characterised in that the carrier material is silica and/or $MgCl_2$.

4. Catalyst composition according to claim 1, wherein the metallocene compound is obtained by contacting the metallocene according to the formula I, wherein both ligands L are halogen, with a third compound comprising a metal selected from group 13 of the Periodic Table of the Elements, wherein said third compound is different from the aluminoxane or the trialkylaluminium present in the aluminoxane.

5. Catalyst composition according to claim 4, wherein said third compound is an Al containing compound according to the formula

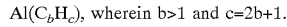
$Al(C_bH_c)$, wherein b>1 and c=2b+1.

6. Catalyst composition according to claim 4, wherein said third compound is trioctylaluminium, triisobutylaluminium, triethylaluminium, isoprenylaluminium, or a mixture thereof.

7. The catalyst composition according to claim 1, wherein the aluminoxane comprises 6 to 10 mol % trialkyaluminum.

8. The catalyst composition according to claim 1, wherein the aluminoxane is methylaluminoxane and the trialkylaluminum is trimethylaluminum.

9. The catalyst composition according to claim 1, wherein L is a hydrocarbon group, an amide, an oxide, a phosphide or a sulphide group.

10. The catalyst composition according to claim 1, wherein M is a metal out of group 4 of the Periodic Table of the Elements.

11. The catalyst composition according to claim 10, wherein M is Ti.

12. The catalyst composition according to claim 2, wherein the carrier material is silica and/or $MgCl_2$.

13. A process for the polymerization of olefins comprising polymerizing an olefin in the presence of a catalyst composition according to claim 1.

14. The process according to claim 13, wherein the olefin is an α-olefin chosen from the group comprising ethene, propene, butene, pentene, heptene, octene and styrene (substituted or non-substituted), or mixtures thereof.

15. The process according to claim 13, wherein the olefin is ethene and/or propene.

16. The process according to claim 13, wherein a rubber-like copolymer is made, based on ethene and another α-olefin, and optionally a diene.

17. The process according to claim 13, wherein a rubber-like copolymer is made, based on ethene and propene, and optionally a diene.

18. A process of forming the catalyst composition of claim 1 comprising forming the metallocene by contacting a metallocene having two halogen containing ligands with a second compound comprising a metal from group 13 of the Periodic Table of the Elements, wherein said second compound is different from the aluminoxane or the trialkylaluminum present in the aluminoxane.

19. The process according to claim 18, wherein the second compound is an Al containing compound according to the formula $AL(C_bH_c)_3$, wherein b>1 and c=2b+1.

20. The process according to claim 18, wherein the second compound is trioctyaluminum, triisobutylaluminum, triethylaluminum, isoprenylaluminum or a mixture thereof.

* * * * *

UNITED STATES PATENT AND TRADEMARK OFFICE
CERTIFICATE OF CORRECTION

PATENT NO. : 6,383,968 B1
DATED : May 7, 2002
INVENTOR(S) : Meijers et al.

It is certified that error appears in the above-identified patent and that said Letters Patent is hereby corrected as shown below:

Column 13,
Line 35, please replace the entire line with the following:
-- $Al(C_bH_c)_3$, wherein b > 1 and c = 2b+1. --

Column 14,
Lines 12-13, should be cancelled as it is identical to claim 3.

Signed and Sealed this

Eighteenth Day of March, 2003

JAMES E. ROGAN
*Director of the United States Patent and Trademark Office*